G. STRANDT & A. H. NIEMANN.
MILK BOTTLING MACHINE.
APPLICATION FILED JAN. 23, 1908.

933,678.

Patented Sept. 7, 1909.
4 SHEETS—SHEET 1.

Witnesses
Jos. M. Gruber
Minnie D. Schienlein

Inventors
Gustav Strandt
August H. Niemann

By George Ashmore Cotter
Attorney

G. STRANDT & A. H. NIEMANN.
MILK BOTTLING MACHINE.
APPLICATION FILED JAN. 23, 1908.

933,678.

Patented Sept. 7, 1909.
4 SHEETS—SHEET 3.

Witnesses

Inventors
Gustav Strandt
August H. Niemann
By George Wetmore Colles
Attorney

G. STRANDT & A. H. NIEMANN.
MILK BOTTLING MACHINE.
APPLICATION FILED JAN. 23, 1908.
933,678.
Patented Sept. 7, 1909.
4 SHEETS—SHEET 4.
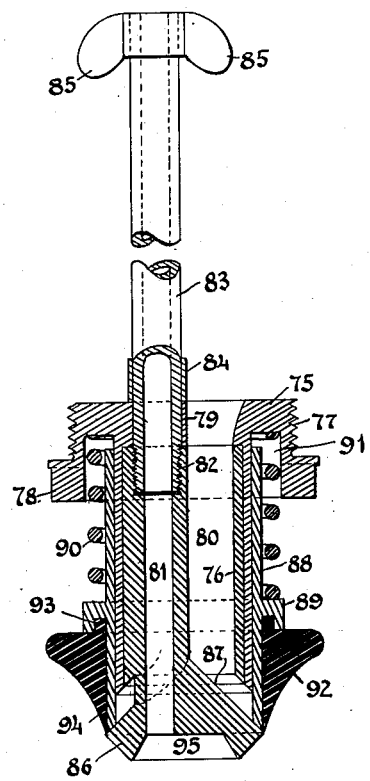
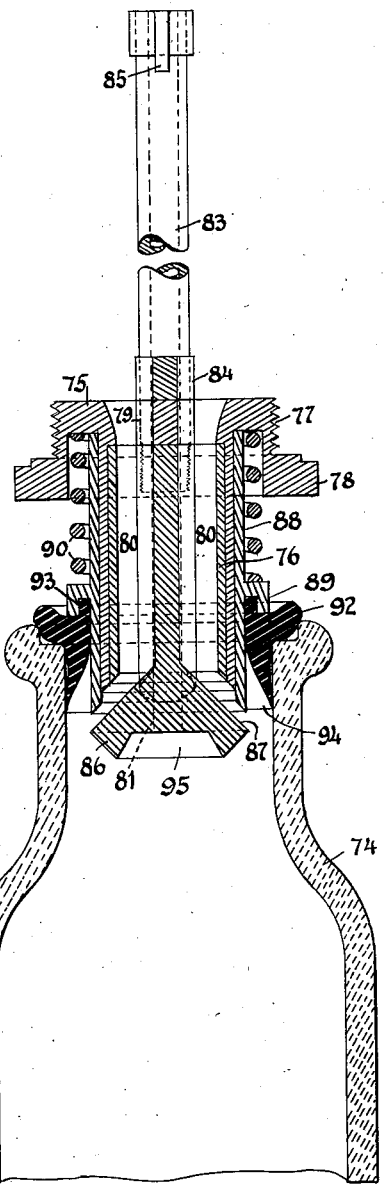

UNITED STATES PATENT OFFICE.

GUSTAVE STRANDT AND AUGUST H. NIEMANN, OF MILWAUKEE, WISCONSIN.

MILK-BOTTLING MACHINE.

933,678.      Specification of Letters Patent.      Patented Sept. 7, 1909.

Application filed January 23, 1908. Serial No. 412,259.

*To all whom it may concern:*

Be it known that we, GUSTAVE STRANDT and AUGUST H. NIEMANN, of Milwaukee, Wisconsin, have invented a Milk-Bottling Machine, of which the following is a specification.

This invention is a machine particularly designed and adapted for bottling milk; although it may be found adaptable to the bottling of other liquids with such changes as may be called for by the special circumstances and conditions present.

As is well understood, milk is put up for the retail market in wide-mouthed bottles, usually in quart, pint or half-pint sizes. We aim to provide an apparatus superior to any heretofore existing in rapidity, efficiency and cleanliness. The principal defect in existing machines, aside from slowness and inconvenience in handling, consists in the fact that they spill the milk on the outside of the bottle. This results in a large proportion of waste, and moreover, what is equally objectionable, the bottle is so coated on the outside with milk, as soon as the film is dry presenting a dirty and unwashed appearance which renders them unsalable. This defect is also especially conspicuous in the case of nicked bottles. Owing to careless and rough handling, the edges of the mouths of the bottles become nicked so that they can no longer be completely closed by the receiving apparatus which delivers the milk from the tank into the bottle. In our invention we provide means which absolutely prevents the milk from exuding and falling on the exterior of the bottle, not only in the case of whole and perfect bottles, but even in the case of nicked bottles. We further provide a guiding-means for setting the bottles, means for shifting filled bottles into a position suitable for inserting the stoppers and placing them in the crates; means for adjusting the machine to different sizes of bottles:
and other accessory and subordinate devices, which will hereinafter appear and which are particularly claimed at the end of this specification.

Figure 1:
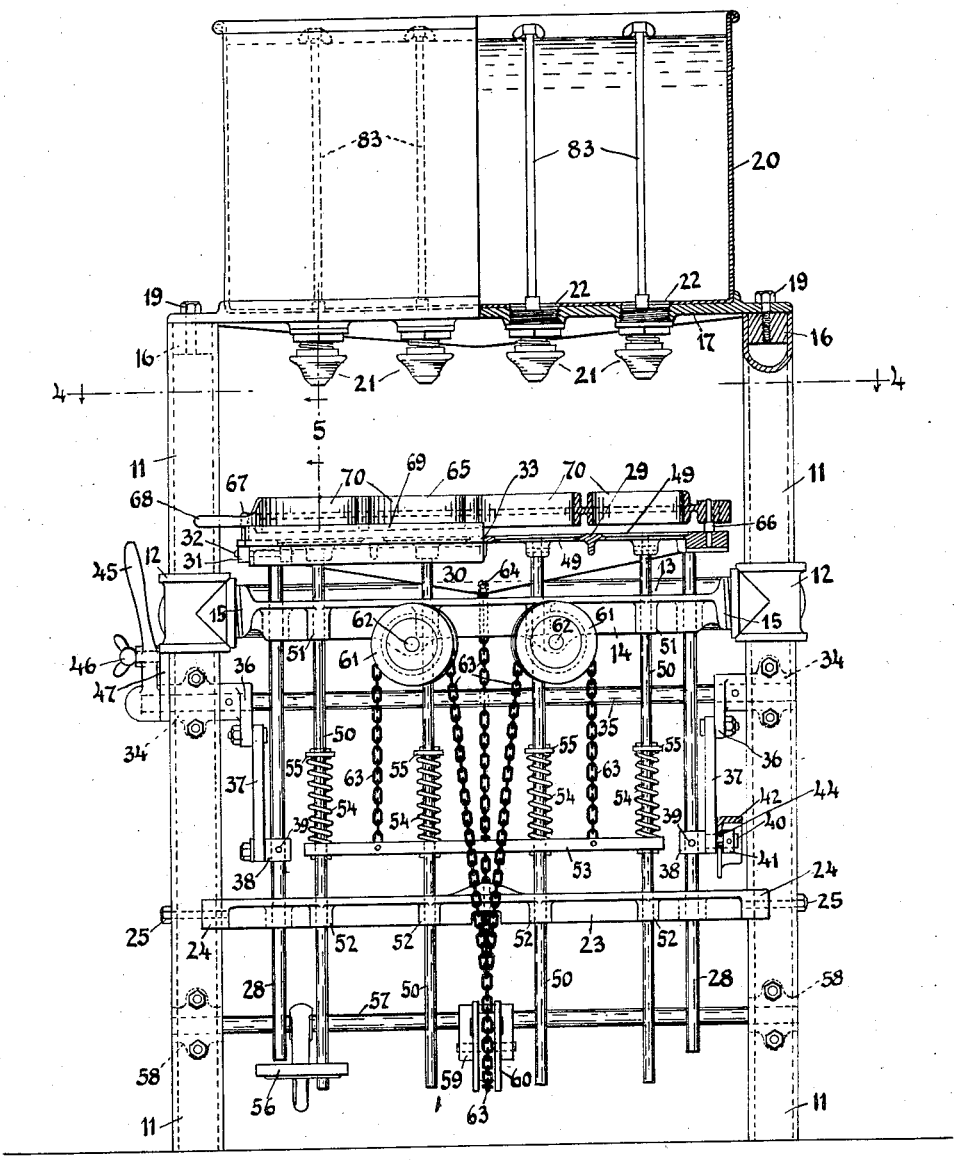
Figure 2:
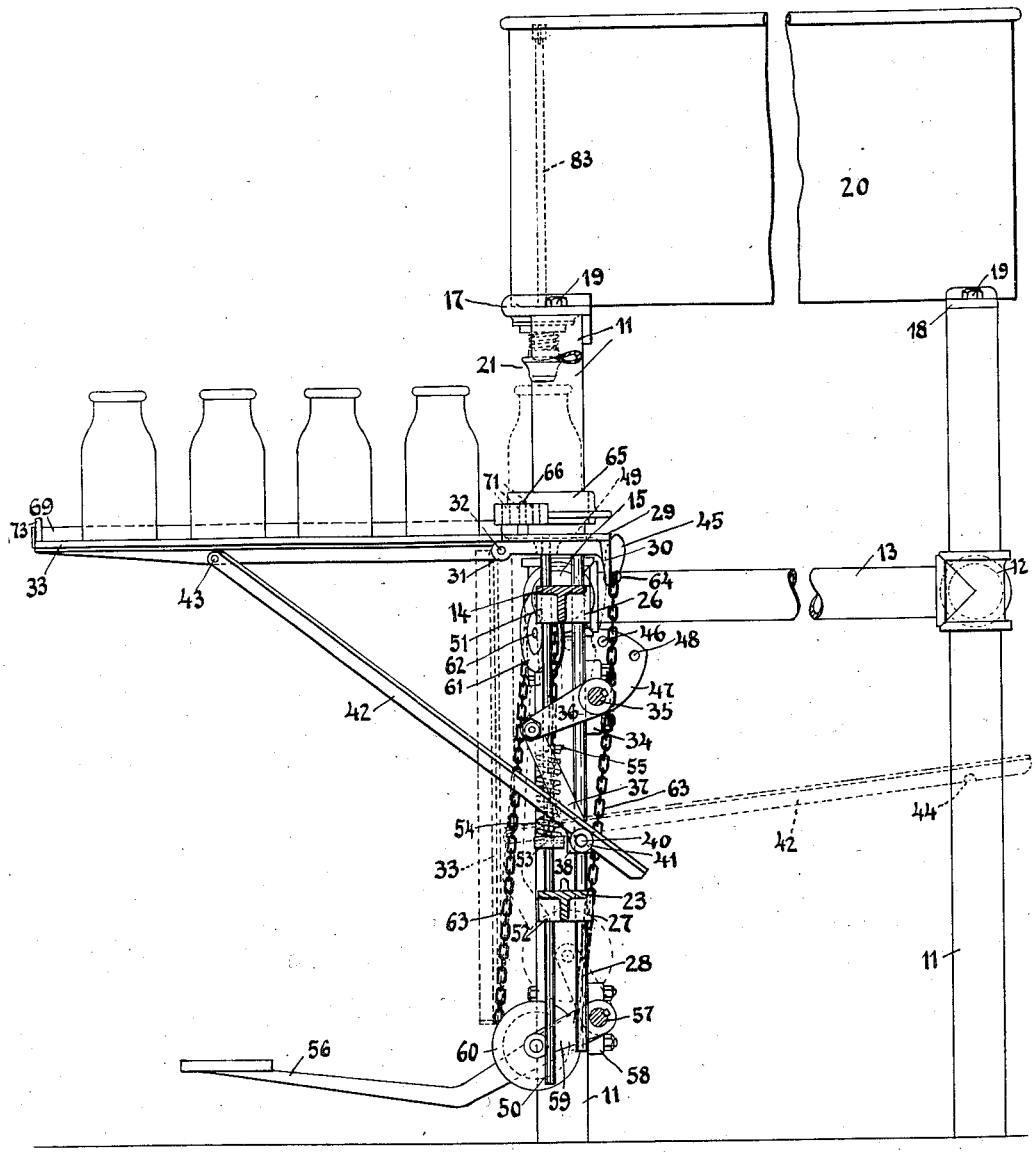
Figures 3, 4, 5:
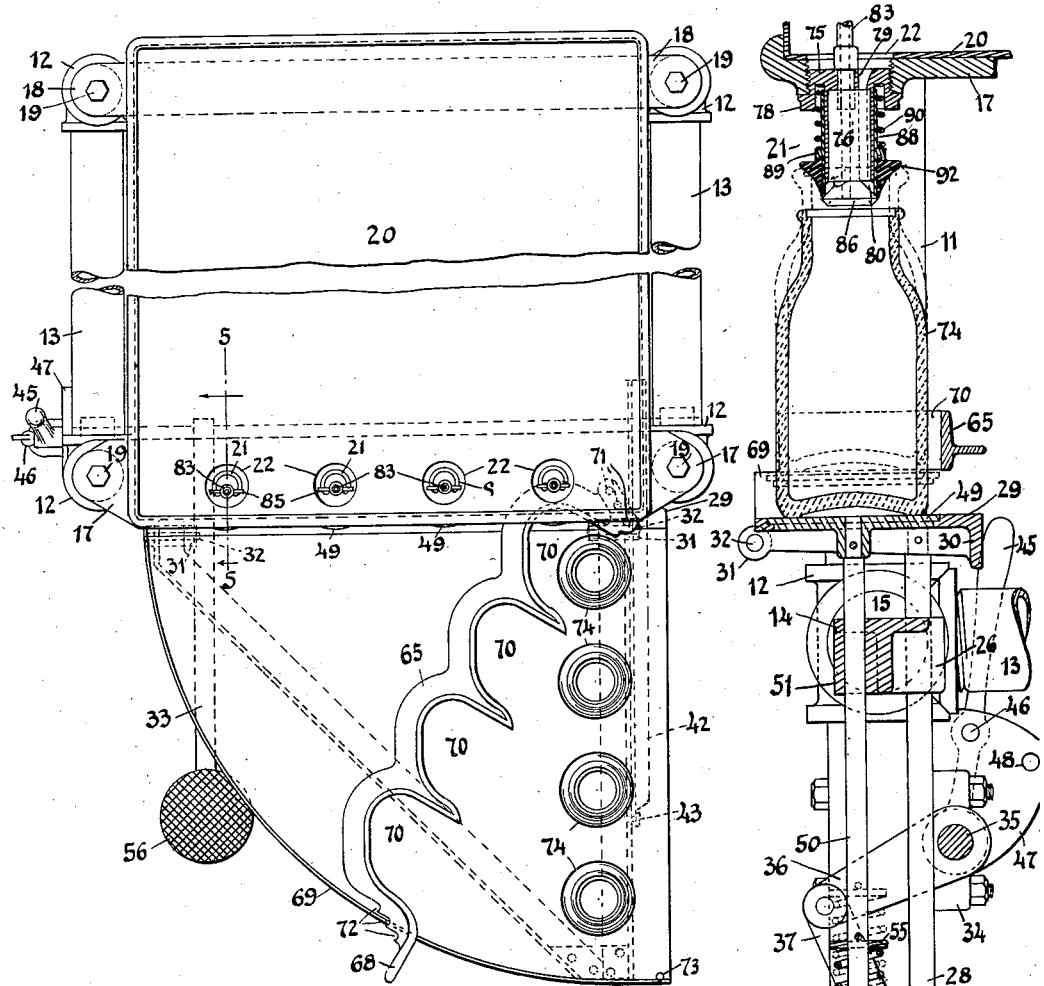

In the accompanying drawings, which illustrate an approved form of our bottle-filler, Figure 1 is a front elevation of the machine, the right-hand half being shown partly in section; Fig. 2 is a side view thereof with one of the frame-posts removed; Fig. 3 is a plan view; Fig. 4 is a partial horizontal section taken on the plane indicated by the line 4 of Fig. 1; Fig. 5 is a partial vertical section on the plane indicated by the line 5 of Fig. 1, on a larger scale; Fig. 6 is a longitudinal section on a large scale of one of our special automatic tank valves; Fig. 7 is a plan view thereof; and Fig. 8 is a longitudinal section of the same in a plane at right-angles to that of Fig. 6 showing its action in filling a milk-bottle.

In these drawings every reference letter and numeral refers always to the same part.

The apparatus comprises, broadly speaking, a frame supporting an elevated tank, and a bottle-filling mechanism mounted on the frame under said tank. The supporting-frame, while it may be constructed in various ways, is very conveniently, cheaply and strongly made by means of gas-pipes, consisting of four corner posts 11 which are each divided intermediately by a four-way tee 12, three horizontal lengths of pipe 13 uniting the four posts at the sides and back by means of the tees, and a transverse bar 14 across the front, which serves in part to support the bottle-filling mechanism as will be hereinafter described, and has screw-bosses 15 upon its ends engaging in the openings of the tees. The upper ends of the posts 11 are closed by means of plugs 16 and are joined two and two by a pair of transverse beams 17, 18, secured to the posts by means of cap-screws 19 engaging the plugs 16; and on said beams 17, 18, rests a supply-tank or reservoir 20, adapted to hold the milk or other liquid and from which the latter is drawn off into the bottles by the means to be presently described. The beam 17 has arranged along its length a plurality of valves 21, which are screwed into suitable threaded holes in the beam as shown, and holes 22 are formed to register therewith in the bottom of the tank 20, which is hermetically secured to the beam 17 to prevent leakage. The special construction of the valves 20 will be hereinafter described; at present it is sufficient to say that they are arranged to close hermetically the mouths of the bottles when pressed thereagainst and by the same pressure to open and deliver milk thereinto, closing when the pressure is removed.

The two front-posts 11, besides being joined by the transverse bar 14, are also connected lower down by a second transverse bar 23, which has lugs 24 fitting the posts and is secured to the latter by cap-screws 25.

These two bars are each provided with a pair of perforated bearing-lugs 26, 27, in which slide a pair of vertical rods 28, which support at their upper ends a horizontal platform 29, the latter having at its rear edge a depending stiffening rib 30 and at its front edge a pair of hinge-lugs 31 carrying pintles 32 to which is pivoted a swinging table-leaf 33, which is of quadrantal form as shown in Fig. 3.

On the rear side of the two front posts 11 are secured bearing-blocks 34, in which is mounted a rock-shaft 35, and on this shaft 35 are mounted rock-arms 36, which are connected by means of links 37 to pivot-blocks 38 secured upon the vertical rods 28 in any approved manner, as by transverse pins 39. One of these pivot-blocks 38, (that on the right-hand side in Fig. 1) has its pivot-pin 40 extended and provided with a collar 41, so as to form a seat for a notched bar 42 pivoted at 43 to the under-side of the leaf 33, and having a notch 44 (see dotted lines in Fig. 2) for that purpose. This enables the leaf 33 to be horizontally extended or to be dropped into vertical position so as to be out of the way when not in use.

On one end of the shaft 35 is mounted a hand-lever 45, which carries a spring-bolt 46, and adjacent to the lever on the post 11 is fixed a plate 47 having a series of holes 48 therein, in which the bolt 46 engages. These holes will be in ordinary practice three in number, corresponding to the three sizes of bottles used in the trade, to wit, quarts, pints, and half-pints. It will be seen that by oscillating the lever 45 the vertical bars 28 and consequently the platform 29 is moved up and down and adjusted in position so as to be closer to or farther from the valves 21.

In the platform 29 are a number of circular rabbeted orifices, in each of which is set a circular-platen 49. Each platen 49 is mounted on the end of a vertical rod 50 which passes through and has bearings in perforated lugs 51, 52 on the transverse bars 14 and 23 respectively. Each platen 49 with its bar 50 is in axial line with one of the valves 21, the whole number corresponding to the number of bottles which the machine is adapted to fill at one time. The present machine possesses four valves and four platens 49, as we have found it most convenient for ordinary hand-work to fill four bottles at once. Each of the bars 50 passes through a hole in a transverse bar 53, and is resiliently connected therewith so as to be raised thereby by means of a coiled compression spring 54 resting on the bar and abutting at its upper end on a collar 55 secured upon the rod 50. The bar 53 may be called a lifting bar, because it acts to raise simultaneously the platens 49 and the bottles which rest upon them, and it is operated by means of a pedal 56 mounted on a transverse shaft 57 which turns in bearing-blocks 58 on the rear side of the posts 11. The shaft 57 carries a forked arm 59 on which is pivoted a sheave 60, and a pair of similar sheaves 61 are mounted to turn on stationary pins 62 on the bar 14. A chain 63 is secured at one end to a pin 64 on the rib 30 of the platform 29, and passes down around the sheave 60, being then divided into two chains, as shown, which pass respectively around the sheaves 61, and have their ends secured to the lifting-bar 53. From this construction it will be evident that the depression of the pedal 56 draws upon the chain 63 and causes the lifting-bar 53 to be raised. The raising and lowering of the platform by the adjusting-lever 45 does not affect the position of the pedal 56 in any way, as the bar 53 is moved up and down along with the platform; so that the pedal 56 is always in the same position and the depression thereof acts merely to raise the platens a short distance above the platform wherever that may be.

In order to provide for a rapid and accurate centering of the bottles with respect to the valves 21, there is arranged immediately over the platform 29 a centering-bar 65, which is pivoted at one end upon a shouldered pin 66 mounted in the platform, and at the other end abuts upon a pin 67 therein, this end being prolonged to form a handle 68 extending over the edge of the table 33. This centering-bar is raised somewhat above the level of the platform so as to permit the raising and lowering of the platen 49 without interfering therewith. To this end the pivot-pin 66 is shouldered as shown in Fig. 1, and the opposite end of the platform and the curved margin of the table 33 are provided with an upstanding rim 69 on which the projecting handle 68 rests. The centering bar has a number of recesses 70, corresponding to the number of platens, and these recesses are of such shape that when the bar is set in either of its three positions, a bottle of the corresponding size if pushed up against the back of the recess will be brought to a stop when exactly in the center of the platen below it. For this purpose the pivoted end of the centering-bar is provided with three holes 71 adapted to receive the pin 66, and the other end is provided with three corresponding notches or shoulders 72 in a line parallel to the line joining the holes 71. Besides serving as a centering bar in the manner described, the bar 65 also serves for quickly moving the bottles away after they are filled, being for this purpose turned about its pivot 66 in the manner illustrated in Fig. 3, and a stop-pin 73 being provided to limit the movement, by which the bottles 74 are brought into the position shown in Fig. 3, and left there while the bar 65 is moved back again into position for receiving another set of bottles.

Our special form of valve, illustrated in Figs. 6, 7 and 8, forms one of the most important elements of our invention and we have found it to be essential to the successful operation of our device enabling the bottle to be filled quickly and automatically with-out spilling a single drop of milk upon the outside of the bottle. The valve-body or casing is made in two parts which fit one within the other, designated 75 and 76 respectively. The member 75, which is the outer member, has a threaded boss 77 engaging the threaded hole in the bottom of the tank or bar 17, and preferably also a polygonal head 78 by which it is turned in and out. This member is concentric except for an eccentric perforated lug 79 on one side near the top, and the inner member 76 fits within it, entering from its lower side. This member 76 is doubly tubular, having an outer concentric passageway 80 and an inner eccentric passage 81 of smaller size, which is threaded as at 82 at its upper end to receive the threaded end of a small air-pipe 83 having a shoulder or collar 84 abutting upon the upper side of the lug 79 and drawing the two members 75, 76 together. The air-tube 83 extends up to above the surface of the liquid in the tank, and may be provided at its upper end with wings 85 whereby it may be screwed up and unscrewed when necessary.

The openings of the passage-ways 80 and 81 in the member 76 are separated by a head 86 whose upper conical surface 87 is faced to form a seat, on which rests the correspondingly ground end of a tubular sleeve 88 which fits closely over the tubular portion of the outer member 75. This sleeve 88 has a shoulder 89 forming an abutment for a coiled compression spring 90 surrounding the sleeve and abutting at its upper end within an annular recess 91 formed in the body-member 75. The sleeve 88 also carries around its lower margin a sealing member consisting of a gasket or washer 92 of elastic nonporous material such as soft rubber, and this gasket abuts upon the shoulder 89 and may have an annular tenon 93 received by a groove therein to hold it in place. In particular the gasket 92 has a long tapering downwardly extending lip 94, and this serves a most important function in the fulfilment of the perfect operation of the device. Were it merely a question of sealing the mouths of bottles whose mouths are perfectly round and even, there would be no difficulty and an ordinary rubber gasket would suffice; but this no longer serves its function when the edge of the bottle-mouth is chipped or broken, as is the case with a great many of the bottles in actual use. We have therefore only by much and extended experimenting invented and devised the form of sealing-gasket here shown, and its exact mode of action is made clear from Fig. 8, in which is shown the position which it assumes when a bottle-mouth is pressed up against it. It will be noted that the bottle-mouth is of such diameter as to press upon the outer margin of the gasket 92, and this together with the shoulder 89 forms a couple which distorts the gasket and causes the lip 94 to press outwardly against the inner surface of the neck of the bottle. Now as soon as the bottle is full, the pressure of the liquid from within acts further to distend the lip 94 and press it against the inner surface of the bottle and thus seal the mouth of the bottle independently of any nicks or irregularities in the edge thereof.

The mode of operation of the device is as follows: The operator stands at the left of the machine with one foot on the pedal and faces toward the right-hand corner, the bottles to be filled being at the left or in front of the machine, and the crate or shipping-case for the filled bottles in front of the open-spaced side of the table 33 on the right. A set of bottles being now placed upon the platen and pushed up against the centering-bar 65, the operator presses upon the pedal for a few moments which raises them until their mouths press upon gasket 92 and slides the valve-sleeve 88 up, thus permitting milk to enter the bottle through the passage 80, while at the same time the air escapes through the passage 81 and pipe 83. The under side of the valve-head 86 may be hollowed out as shown at 95 to prevent any air from becoming trapped below the valve-head and to prevent milk from being drawn into the air-vent and sealing it. As soon as the bottle is full, the liquid rises in the pipe 83 to the level of the liquid in the tank, this operation lasting but a fraction of a minute, and when completed the operator releases the pedal, and the bottles descending allow the sleeves to be closed by the springs 90, and thereafter are unsealed from the gaskets 92. The small quantity of milk in the passage 81 and tube 83 is just sufficient, or a little less than sufficient, to fill up the empty space in the bottle previously filled by the end of the valve. The valve-seat and valve being ground accurately, it is thus impossible for a single drop of milk to escape. The operator now swings around the bar 65 and back again moving the filled bottles to the right-hand side of the table, places a fresh set on the platen, and while these are filling his hands are free to insert stoppers in the mouths of the filled milk-bottles and place them in the crate or shipping-case.

We fully realize that our invention is capable of great variety of construction without departing from the spirit thereof, and also that some features thereof may be used independently in connection with other apparatus; and we therefore do not consider its scope further restricted than is specifically set forth in our claims.

Having thus described our invention, what we claim as new and desire to secure by Letters Patent is:

1. In a device of the class described, in combination, a plurality of vertically movable bottle-supports, a tank having a plurality of openings in the lower side thereof immediately over the respective supports, a plurality of valves normally closing the respective openings and adapted to be opened by upward pressure thereon from below, means carried by said valves for sealing the mouths of the bottles around the valves when said bottles are pressed thereagainst by the raising of said supports, a pedal, means connecting said supports with said pedal whereby they are simultaneously raised by depressing it, and means for simultaneously vertically adjusting the normal heights of said supports independent of said pedal.

2. In a device of the class described, in combination, a tank, a vertically adjustable platform below said tank, means for setting said platform in various positions relative to said tank, a platen set in said platform on a level therewith and vertically movable with respect thereto, an automatic bottling valve in said tank immediately over said platen, and means occupying a position independent of the adjustment of said platform for raising said platen a given distance above said platform.

3. In a device of the class described, in combination, a tank, a vertically adjustable platform below said tank, means for setting said platform in various positions relative to said tank, a platen set in said table on a level therewith and vertically movable with respect thereto, an automatic bottling valve in said tank immediately over said platen, and an oscillating pedal occupying a fixed position independent of the adjustment of said table and adapted to raise said platen above said platform when depressed.

4. In a device of the class described, in combination, a tank, a vertically adjustable platform below said tank, means for setting said platform in various positions relative to said tank, a platen set in said table on a level therewith and vertically movable with respect thereto, an automatic bottling valve in said tank immediately over said platen, a member by which said platen is supported, a flexible connection connected at one end to said platform and at the other to said member, said connection passing around sheaves, and means for separating said sheaves whereby to raise said member and the platen supported by it above said platform.

5. In a device of the class described, in combination, a tank, a vertically adjustable platform below said tank, a platen mounted in an opening in said platform, means for vertically adjusting said platform, a supporting-member for said platen, a fixed sheave, a rock-arm and a second sheave carried thereby, a flexible connection attached at one end to said platform and passing around said sheaves successively and attached at the other end to said supporting member for said platen, and means for oscillating said rock-arm whereby to raise said platen above said platform independently of the vertical adjustment of the latter.

6. In a device of the class described, in combination, a tank, a vertically adjustable platform below said tank, a platen mounted in an opening in said platform, means for vertically adjusting said platform, a supporting-member for said platen, a fixed sheave, a rock-arm and a second sheave carried thereby, a flexible connection attached at one end to said platform and passing around said sheaves successively and attached at the other end to said supporting member for said platen, means for oscillating said rock-arm whereby to raise said platen above said platform independently of the vertical adjustment of the latter and a coiled compression spring interposed between said supporting-member and said platen.

7. In a device of the class described, in combination, a tank, a vertically adjustable platform below said tank, a pair of vertical guide-rods supporting said platform, a shaft having rock-arms, links connecting said rock-arms with said guide-rods whereby to adjust the vertical position of the latter when the shaft is turned, a platen mounted in an opening in said platform and normally flush therewith, a vertical guide-rod on the upper end of which said platen is mounted, a supporting-member for said guide-rod, and means independent of the vertical adjustment of said table for raising said guide-rod and thereby the platen above the level of said table.

8. In a device of the class described, in combination, a tank, a vertically adjustable platform below said tank, a platen mounted in an opening in said platform, means for vertically adjusting said platform, a supporting-member for said platen, a fixed sheave, a rock-arm and a second sheave carried thereby, a flexible connection attached at one end to said platform and passing around said sheaves successively and attached at the other end to said supporting-member for said platen, a pedal oscillating about a stationary axis, and means connecting said pedal with one of said sheaves for raising said platen relative to said platform independently of the position of the latter.

9. In a device of the class described, in combination, a tank, a vertically adjustable platform below said tank, a pair of vertical guide-rods supporting said platform, a shaft having rock-arms, links connecting said rock-arms with said guide-rods whereby to adjust the vertical position of the latter when the shaft is turned, a platen mounted in an opening in said platform and normally flush therewith, a vertical guide-rod on the upper end of which said platen is mounted, a supporting-member for said guide-rod, means connecting said supporting-member with said platform-adjusting means whereby said supporting-member is raised and lowered vertically along with said platform in the adjustment thereof, and means acting independently of said platform for raising said supporting-member and thereby the platen relative to said platform.

10. In a device of the class described, in combination, a tank, a vertically adjustable platform below said tank, a pair of vertical guide-rods supporting said platform, a shaft having rock-arms, links connecting said rock-arms with said guide-rods whereby to adjust the vertical position of the latter when the shaft is turned, a platen mounted in an opening in said platform and normally flush therewith, a vertical guide-rod on the upper end of which said platen is mounted, a supporting-member for said guide-rod, means connecting said supporting-member with said platform-adjusting means whereby said supporting-member is raised and lowered vertically along with said platform in the adjustment thereof, a pedal turning on a stationary axis, and means connecting said pedal with said supporting-member for raising the latter relative to said platform independently of the vertical adjustment thereof.

11. In a device of the class described, in combination, a tank, a vertically adjustable platform below said tank, a pair of vertical guide-rods supporting said platform, a shaft having rock-arms, links connecting said rock-arms with said guide-rods whereby to adjust the vertical position of the latter when the shaft is turned, a platen mounted in an opening in said platform and normally flush therewith, a vertical guide-rod on the upper end of which said platen is mounted, a supporting-member for said guide-rod, means connecting said supporting-member with said platform-adjusting means whereby said supporting-member is raised and lowered vertically along with said platform in the adjustment thereof, a pedal turning on a stationary axis, a rock-arm on the axis of said pedal and operated thereby, a sheave carried by said rock-arm, a stationary sheave, and a flexible connection attached at one end to said platform and passing successively around said two sheaves and connected at the other end to said supporting-member, whereby the latter is raised relative to said platform by the depression of said pedal.

12. In a device of the class described, in combination, a tank having a plurality of automatic bottling-valves on the under side thereof, a vertically adjustable platform, a plurality of platens set in openings therein so as to be normally flush therewith, means for vertically adjusting said platform, a plurality of vertical guide-rods on the upper ends of which said platens are respectively mounted, stationary bearings in which said guide-rods reciprocate, a transverse supporting-bar through holes in which said guide-rods pass, a plurality of springs supporting the respective guide-rods from said supporting-bar, a depressible pedal, a sheave actuated by said pedal and depressed thereby, a pair of stationary sheaves, and a flexible connection connected at one end to said platform, passing around said first-named sheave, then divided into two branches, one of which passes around each of said second-named sheaves, and the ends of said branches secured to said supporting-bar.

13. In a device of the class described, in combination, a table or platform, a plurality of vertically raisable platens set therein and a centering bar having recesses therein adapting it to center bottles pushed into said recesses concentrically with said platens.

14. In a device of the class described, in combination, a table or platform, a plurality of vertically raisable platens set therein, and a centering bar having recesses therein adapting it to center bottles pushed into said recesses concentrically with said platens, said centering-bar being movable outwardly whereby all the bottles on said platens are simultaneously brought forward to make way for another set of bottles.

15. In a device of the class described, in combination, a table or platform, a plurality of vertically raisable platens set therein and a centering bar having recesses therein adapting it to center bottles pushed into said recesses concentrically with said platens; said centering-bar being pivoted at one end and swingable outwardly about its pivot whereby to move all the bottles centered by it simultaneously into a row at one side of the platform.

16. In a machine of the class described, in combination with a platform, a plurality of vertically movable platens set therein, means for raising said platens relative to said platform, and a centering-bar movably mounted above said platform and having abutment-means for bringing it into various positions corresponding to different sizes of bottles and recesses therein fitting said different sizes of bottles and adapted to center them respectively over said platens when in its respective positions.

17. In a machine of the class described, in combination, a platform, a plurality of vertically movable platens set therein, means for raising said platens above said platform, and a movable centering-bar mounted over said platform at a distance thereabove greater than the vertical movement of said platens, said centering-bar having a plurality of recesses therein corresponding to the several platens and adapted to center bottles over the latter when said bottles are pushed into said recesses and abut thereagainst, said centering bar remaining fixed when said platens are raised with the bottles.

18. In a machine of the class described, in combination, a platform, a vertically movable platen set therein and normally flush therewith, and means for raising said platen above said platform, a centering-member for a bottle comprising a member having a recess therein, said centering-member having a plurality of positions corresponding to different sizes of bottles, and said recess being adapted to center bottles of respective sizes over said platens and concentrically therewith when said centering member is mounted in the corresponding position.

19. In a device of the class described, in combination, a platform, a vertically movable platen set therein, means for raising said platen above said platform, and a centering-member pivoted on a pin at one side of said platen and having a recess therein adapted to center a bottle concentrically over said platen when pushed into and against the back of said recess; said centering-member having a plurality of pivotal points corresponding to different sizes of bottles, and a plurality of abutment shoulders at the other end likewise corresponding to the different sizes of bottles; and said recess having such form as to center a bottle of the proper size over said platen when said centering-member is pivoted upon the corresponding pivotal point at one end, and abuts against the corresponding shoulder at the other end.

20. In a device of the class described, in combination, a platform having a quadrant-shaped extension, a centering-bar pivoted approximately at the center of said quadrant, a plurality of platens mounted in a row normally flush with said platform in orifices therein, and means for raising said platens above said platform; said centering-bar having a plurality of recesses therein adapted to center bottles over the respective platens when pushed into and against the back of said recesses and said centering-bar swinging through an approximate quarter-circle whereby to move all of the bottles so centered to a row at right-angles with the row of platens and at one side of said platform.

21. In a device of the class described, a bottle-filling valve having a nozzle adapted to enter the mouth of the bottle and an opening therein, a member resiliently closing said opening, said member being adapted to be engaged by the mouth of said bottle and by upward pressure thereon to open said opening, and a sealing-gasket carried by said closing-member and adapted to be engaged over and seal the mouth of said bottle, said gasket having a downwardly extending annular lip adapted to be pressed outwardly against the inner face of the neck of the bottle whereby said gasket acts to seal the bottle by pressure from within.

22. In a device of the class described, in combination with a bottle-filling valve having a nozzle adapted to extend within the mouth of the bottle, an annular sealing-gasket surrounding said nozzle and having a downwardly extending annular lip adapted when in the neck of the bottle to automatically expand and press on the inner face of the bottle-neck thus sealing the bottle by pressure from within independently of the regular or irregular character of the edge of the mouth of the bottle.

23. In a device of the class described, in combination with a bottle-filling valve having a nozzle adapted to extend within the mouth of the bottle, and an opening in the lower end thereof through which the filling liquid is projected, an annular sleeve closing said opening and adapted when raised to open said opening, and a sealing-gasket carried by said sleeve and adapted to close the mouth of a bottle; said sleeve having a projecting part engaging the upper rim of said gasket, and the latter having a part projecting beyond said projecting part and engaged by the bottle-mouth when pressed thereagainst, and having further a downwardly projecting lip extending inside the bottle; whereby the pressure of the bottle-mouth upon said gasket produces a distorting and expanding force upon said lip, the latter being thus caused to hug the inner surface of said bottle.

24. In a device of the class described, in combination with a bottle-filling valve having a nozzle adapted to extend within the mouth of the bottle, an annular sealing-gasket surrounding said nozzle and engaged around the upper margin thereof by a projecting part of said nozzle; said gasket having a further projecting part engaged by the mouth of a bottle, and a downwardly extending lip adapted to project within the mouth of the bottle; whereby an upward pressure of the bottle-mouth upon the projecting portion of said gasket produces a distorting force thereon adapted to expand said lip and cause it to hug the inner surface of said bottle.

25. In a device of the class described, a bottle-filling valve comprising a tubular nozzle-piece adapted to be connected with a source of liquid supply, a tubular-plug fitting within said nozzle-piece from the lower end thereof and having a central tubular-passageway for liquid and a head opposite the end of said passageway leaving an annular opening between the lower end of said passageway and said head, said plug having also an air-duct opening on the under side of said head, and a sleeve reciprocably mounted on said nozzle-piece and adapted to close said annular passageway abutting against said head when lowered and having a projecting portion adapted to be engaged by the mouth of a bottle to raise it to open said valve.

26. In a device of the class described, a bottle-filling valve comprising a tubular nozzle-piece adapted to be connected with a source of liquid supply, a tubular plug fitting within said nozzle-piece from the lower end thereof and having a central tubular passageway for liquid and a head opposite the end of said passageway leaving an annular opening between the lower end of said passageway and said head, said plug having also an air-duct opening on the under side of said head, and a sleeve reciprocably mounted on said nozzle-piece and adapted to close said annular passageway abutting against said head when lowered and having a projecting portion adapted to be engaged by the mouth of a bottle to raise it to open said valve; in conjunction with a spring surrounding said sleeve abutting at one end against said nozzle-piece and at the other against said projecting portion and adapted to hold said sleeve resiliently in closing or lowered position.

27. In a bottle-filling valve, the combination of a tubular nozzle-piece, a plug containing an air-duct fitting within said nozzle-piece from one end, and a tubular continuation of said air-duct engaging said plug from the other end of said nozzle-piece and holding all three parts together.

28. In a bottle-filling valve, the combination of a tubular nozzle-piece, a plug containing an air-duct fitting within said nozzle-piece from one end, a tubular continuation of said air-duct engaging said plug from the other end of said nozzle-piece and holding all three parts together, and a sleeve slidably mounted upon said nozzle-piece and forming a closure.

29. In a bottle-filling valve, the combination of a tubular nozzle-piece, a tubular plug fitting within said nozzle-piece from the lower end thereof, the central passage of said plug forming a continuation of the passageway of said nozzle-piece, said plug having further a second passageway forming an air-vent, and a tubular stem fitting in the upper end of said nozzle-piece and engaging said plug whereby to secure all three parts together; said plug and stem being each provided with abutting portions which abut against said nozzle-piece.

30. In a bottle-filling valve, the combination of a tubular nozzle-piece, a tubular plug fitting within said nozzle-piece from the lower end thereof, the central passage of said plug forming a continuation of the passageway of said nozzle-piece, said plug having further a second passageway forming an air-vent, and a tubular stem fitting in the upper end of said nozzle-piece and engaging said plug whereby to secure all three parts together; said plug and stem being each provided with abutting portions which abut against said nozzle-piece, said plug having further on its lower end a head spaced apart from the lower end of said nozzle-piece; and a closure sleeve mounted on said nozzle-piece.

31. In a bottle-filling valve, the combination of a tubular nozzle-piece having a central passageway which has an annular shoulder therein, a cylindrical tubular plug fitting within the passageway of said nozzle-piece, the end thereof abutting against said annular shoulder, said plug being provided with a liquid-passageway and an air-passageway and said nozzle-piece having a perforated lug immediately over the end of said air passageway, and a tubular stem fitting within said perforated lug and having a threaded end engaging in a threaded socket formed in said plug on the end of said air-passageway, said stem having a shoulder thereon abutting against the upper face of said perforated lug.

32. In a bottle-filling valve, the combination of a tubular nozzle-piece having a central passageway which has an annular shoulder therein, a cylindrical tubular plug fitting within the passageway of said nozzle-piece, the end thereof abutting against said annular shoulder, said plug being provided with a liquid-passageway and an air-passageway and said nozzle-piece having a perforated lug immediately over the end of said air passageway, and a tubular stem fitting within said perforated lug and having a threaded end engaging in a threaded socket formed in said plug on the end of said air passageway, said stem having a shoulder thereon abutting against the upper face of said perforated lug, a head on the lower end of said tubular plug forming a prolongation of said air-passageway and separating it from said liquid-passageway, being separated from the cylindrical periphery of the plug by an annular interval, and a tubular valve-sleeve mounted on said nozzle-piece, the lower end thereof normally resting against said head and thereby closing said liquid-passageway.

33. A bottle-filling valve having two longitudinal passageways one for air the other for liquid, which are non-concentric for the length of the valve, the liquid passageway terminating in an annular outflow opening surrounding the lower end of said air-passageway.

In witness whereof, we have hereunto set our hands this eighteenth day of January, 1908.

GUSTAVE STRANDT.
AUGUST H. NIEMANN.

Witnesses:
EMIL UMFRID,
FRANK BURMEISTER.